(12) United States Patent
Odate et al.

(10) Patent No.: US 11,664,751 B2
(45) Date of Patent: May 30, 2023

(54) MOTOR CONTROL APPARATUS AND IMAGE FORMING APPARATUS THAT DETECT ROTOR POSITION

(71) Applicant: CANON KABUSHIKI KAISHA, Tokyo (JP)

(72) Inventors: Takashi Odate, Mishima (JP); Hidetoshi Hanamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/516,911

(22) Filed: Nov. 2, 2021

(65) Prior Publication Data

US 2022/0060128 A1 Feb. 24, 2022

Related U.S. Application Data

(63) Continuation of application No. 16/781,101, filed on Feb. 4, 2020, now Pat. No. 11,196,365.

(30) Foreign Application Priority Data

Feb. 19, 2019 (JP) .............................. JP2019-027653

(51) Int. Cl.
| | |
|---|---|
| G03G 21/16 | (2006.01) |
| H02P 6/16 | (2016.01) |
| H02P 6/20 | (2016.01) |
| G03G 15/00 | (2006.01) |
| G03G 15/16 | (2006.01) |

(52) U.S. Cl.
CPC .......... *H02P 6/16* (2013.01); *G03G 15/1615* (2013.01); *G03G 15/5008* (2013.01); *H02P 6/20* (2013.01)

(58) Field of Classification Search
CPC ......... H02P 6/16; H02P 6/20; G03G 15/5008; G03G 21/16
See application file for complete search history.

(56) References Cited

U.S. PATENT DOCUMENTS

| | | | |
|---|---|---|---|
| 9,431,940 B2 | 8/2016 | Kameyama | |
| 2005/0169658 A1* | 8/2005 | Hanamoto | ......... G03G 15/2039 399/88 |
| 2011/0243590 A1* | 10/2011 | Ito | .......................... G03G 21/16 399/51 |
| 2015/0145454 A1 | 5/2015 | Kameyama | |

FOREIGN PATENT DOCUMENTS

| | | |
|---|---|---|
| JP | 10-271882 A | 10/1998 |
| JP | 2010-088267 A | 4/2010 |
| JP | 2014-147259 A | 8/2014 |
| JP | 2015-104263 A | 6/2015 |
| JP | 2018-191391 A | 11/2018 |

OTHER PUBLICATIONS

Japanese Office Action dated Feb. 24, 2023 in counterpart Japanese Patent Appln. No. 2019-027653.

* cited by examiner

*Primary Examiner* — Cortez M Cook
(74) *Attorney, Agent, or Firm* — Venable LLP

(57) ABSTRACT

A motor control apparatus includes: a switching power supply; a first motor configured to operate with a voltage from the switching power supply; and a control unit configured to control the first motor, wherein the control unit is further configured to cause the switching power supply to supply power of the switching power supply to a load other than the first motor before detecting an initial position of a rotor of the first motor using a current flowing through the first motor.

17 Claims, 12 Drawing Sheets

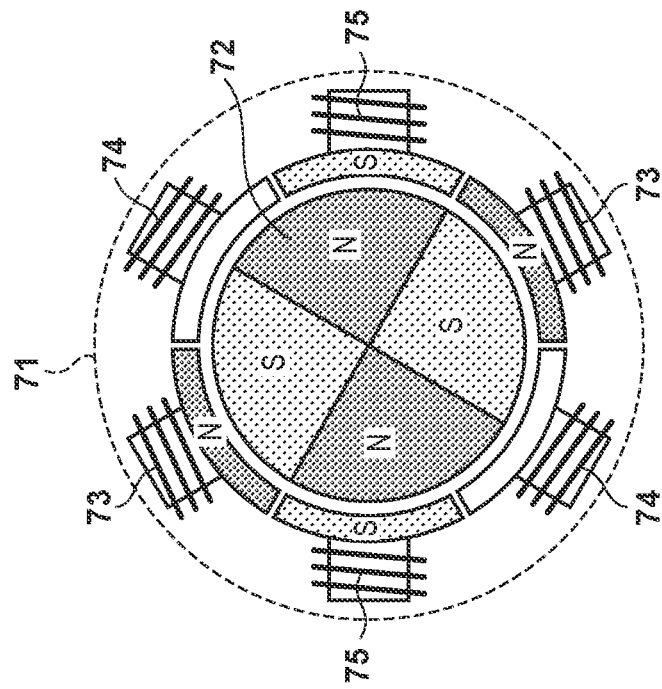
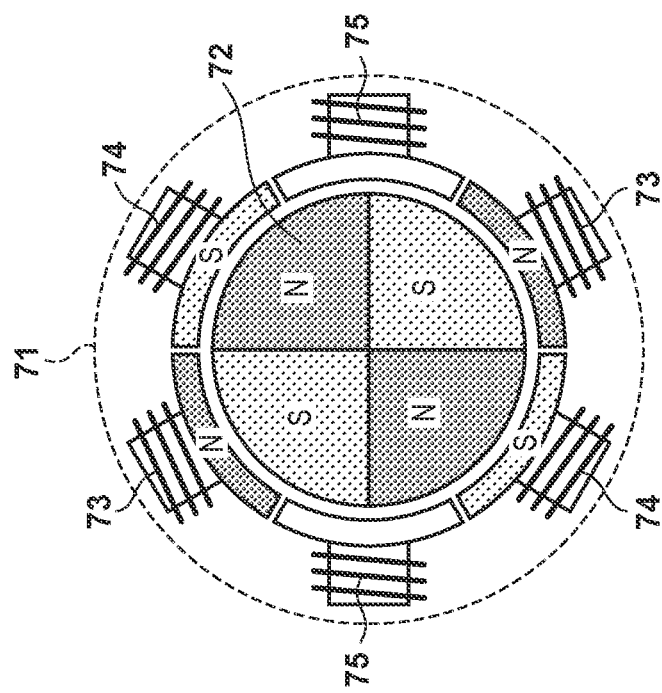

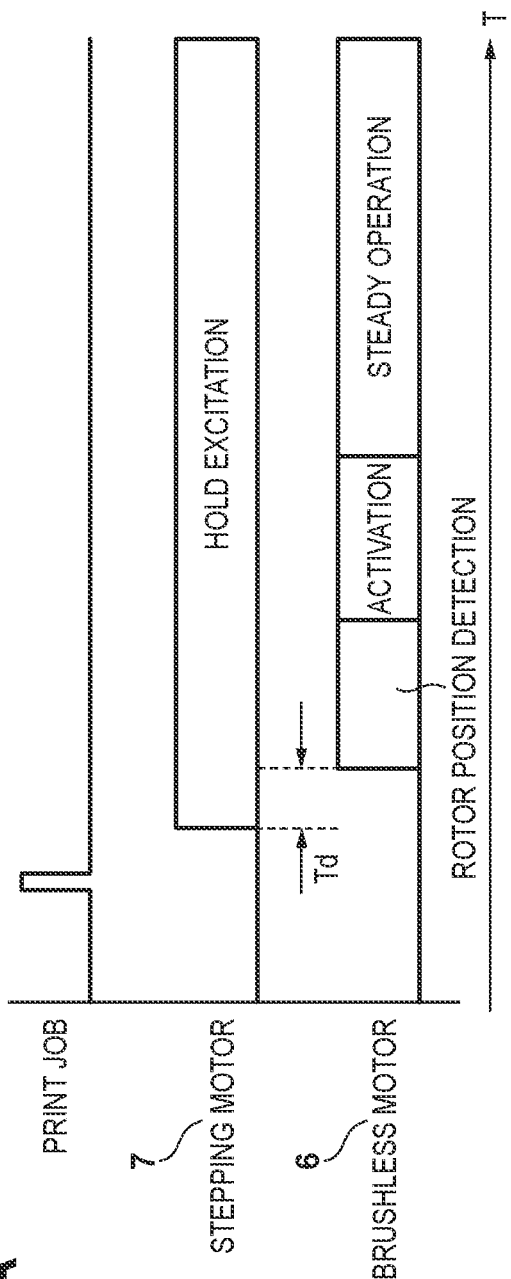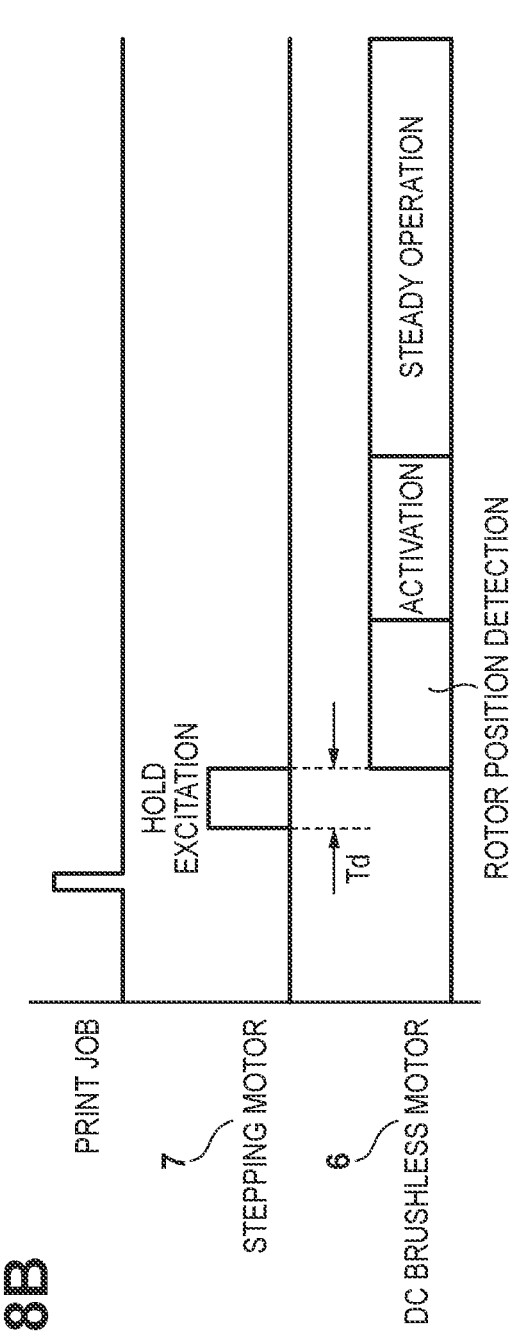

MOTOR CONTROL APPARATUS AND IMAGE FORMING APPARATUS THAT DETECT ROTOR POSITION

CROSS-REFERENCE TO RELATED APPLICATIONS

This application is a Continuation of U.S. patent application Ser. No. 16/781,101, filed on Feb. 4, 2020, which claims priority to Japanese Patent Application No. 2019-027653, filed Feb. 19, 2019, the entire contents of which are both hereby incorporated by reference herein.

BACKGROUND OF THE INVENTION

Field of the Invention

The present invention relates to a motor control technique, and more particularly, to a technique for suppressing fluctuations in the output voltage of a power supply in a detection processing of the rotor position in a motor.

Description of the Related Art

A sensorless DC brushless motor having no Hall element is used as a driving source for a rotating member of an image forming apparatus. For the sensorless DC brushless motor, the rotor position can be detected using an induced voltage during high-speed rotation of the rotor. However, during stoppage of the rotor or during low-speed rotation with a low induced voltage, the rotor position cannot be detected using the induced voltage. For this reason, US-2015-145454 discloses a configuration in which the rotor position is detected by measuring the coil impedance, which changes depending on the rotor position. In US-2015-145454, the coil impedance is measured by passing a current through the coil.

Here, a switching power supply that supplies operating power to the motor performs feedback control in order to make the output DC voltage constant. However, in the configuration described in US-2015-145454, since the amount of change per unit time in the current flowing through the coil is large, it cannot be followed by feedback control, causing a voltage drop or ripples in the output voltage of the switching power supply. Although the voltage drop and the ripples can be reduced by increasing the capacity of a smoothing capacitor of the switching power supply, the substrate area is increased, leading to an increase in costs.

Japanese Patent Laid-Open No. 2014-147259 discloses a configuration in which the on-time of a switching element of the switching power supply is increased in order to suppress fluctuations in the output voltage of the switching power supply due to a load change.

However, if the on-time of the switching element of the switching power supply is increased irrespective of a small load, power is excessive until the load increases, resulting in that the output voltage becomes temporarily higher than that in the steady state. In the rotor position detection processing described in US-2015-145454, a value of the current flowing through the coil, that is, the load changes depending on the rotor position. Therefore, it is difficult to adjust the timing at which the switching element is turned on in advance, and it is difficult to apply the technique described in Japanese Patent Laid-Open No. 2014-147259 in order to reduce ripples.

SUMMARY OF THE INVENTION

According to an aspect of the present invention, a motor control apparatus includes: a switching power supply; a first motor configured to operate with a voltage from the switching power supply; and a control unit configured to control the first motor, wherein the control unit is further configured to cause the switching power supply to supply power of the switching power supply to a load other than the first motor before detecting an initial position of a rotor of the first motor using a current flowing through the first motor.

Further features of the present invention will become apparent from the following description of exemplary embodiments with reference to the attached drawings.

BRIEF DESCRIPTION OF THE DRAWINGS

FIGS. 5A and 5B are configuration diagrams of a motor according to an embodiment.

FIGS. 8A and 8B are sequence diagrams of the rotor position detection processing according to an embodiment.

DESCRIPTION OF THE EMBODIMENTS

Figure 1:
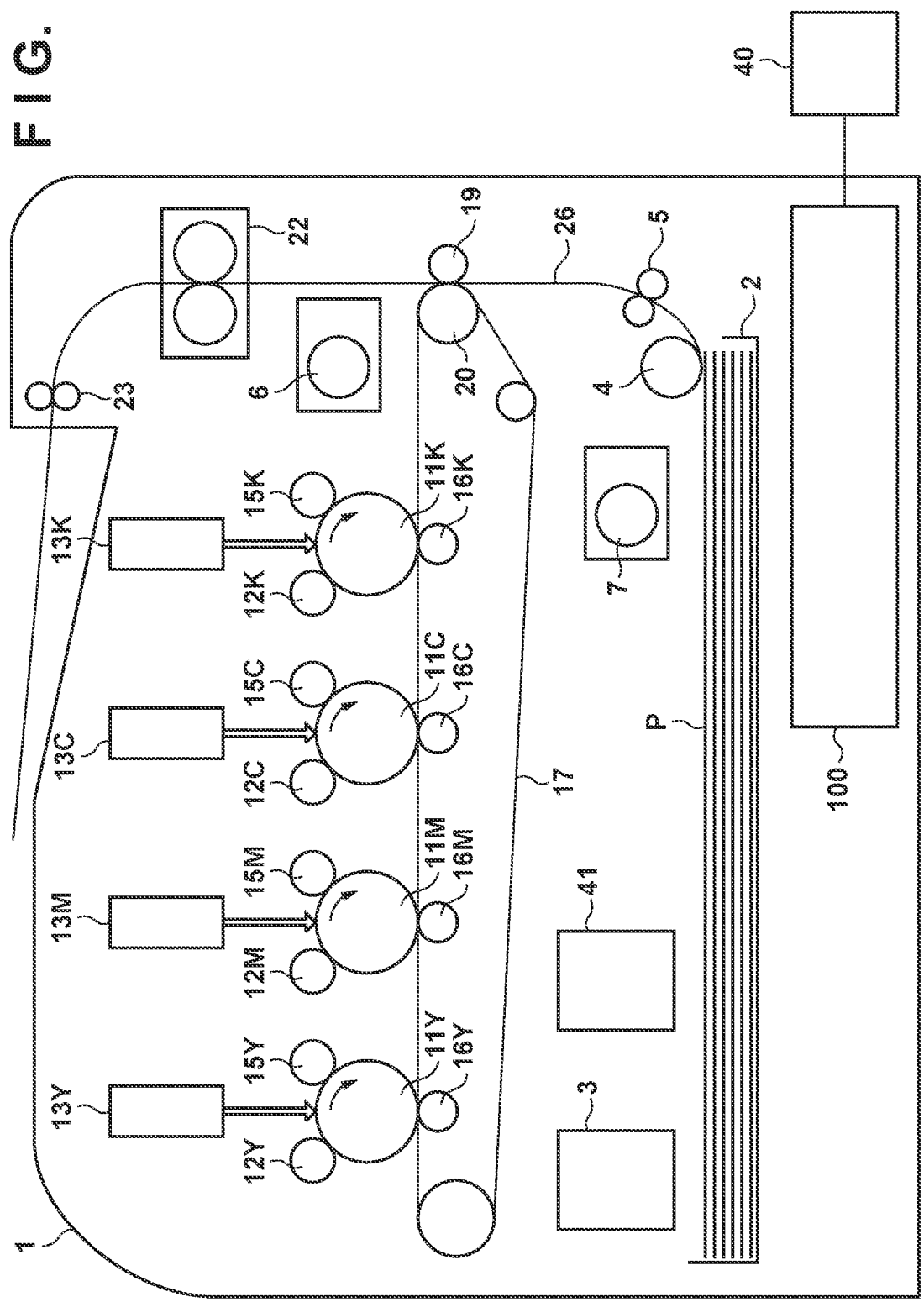
FIG. 1 is a configuration diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of an image forming apparatus 1 according to the present embodiment, such as a printer, a copier, a multifunction device, and a facsimile. The image forming apparatus 1 forms a full color image by superimposing four color toner images of yellow (Y), magenta (M), cyan (C), and black (K). In FIG. 1, Y, M, C, and K at ends of reference numerals indicate that the colors of the toner images involved in the formation of members indicated by the reference numerals are yellow, magenta, cyan, and black. In the following description, when it is not necessary to distinguish the colors from each other, reference numerals excluding Y, M, C, and K at the ends are used. At image formation, a photosensitive member 11 is rotationally driven in a clockwise direction in the drawing. A charging unit 12 charges the surface of the photosensitive member 11 to a uniform potential. An exposing unit 13 exposes the surface of the photosensitive member 11 with light to form an electrostatic latent image on the photosensitive member 11. A developing roller 15 of a developing unit develops the electrostatic latent image on the photosensitive member 11 with toner and visualizes the image as a toner image. A primary transfer unit 16 transfers the toner image formed onto the photosensitive member 11 to an intermediate transfer belt 17 by primary transfer bias. The toner image formed on each photosensitive member 11 is superimposed and transferred onto the intermediate transfer belt 17 to form a full-color image on the intermediate transfer belt 17. The intermediate transfer belt 17 is rotationally driven in the counterclockwise direction in the figure by a driving roller 20. As a result, the toner image transferred onto the intermediate transfer belt 17 is conveyed to a position opposed to a secondary transfer unit 19.

On the other hand, a recording material (sheet) P stored in a cassette 2 is fed to a conveyance path 26 by a feeding roller 4, and is conveyed to the position opposed to the secondary transfer unit 19 by a conveying roller 5. The secondary transfer unit 19 transfers the toner image on the intermediate transfer belt 17 onto the recording material P by secondary transfer bias. Thereafter, the recording material P is conveyed to a fixing device 22. The fixing device 22 heats and presses the recording material P to fix the toner image on the recording material P. The recording material P on which the toner image is fixed is discharged to the outside of the image forming apparatus 1 by a discharge roller 23. A stepping motor 7 transmits a driving force to the feeding roller 4 and the conveying roller 5 through a gear mechanism not illustrated. Further, the DC brushless motor 6 is controlled by a motor control unit 41 such that its driving force is transmitted to the photosensitive member 11, the charging unit 12, the developing roller 15, the primary transfer unit 16, and the driving roller 20 through a gear mechanism not illustrated. It is noted that the DC brushless motor 6 is a sensorless-type motor that includes no Hall element and requires initial position detection processing at activation. On the contrary, the stepping motor 7 is a motor that does not require the initial position detection processing at activation. The stepping motor 7 and the DC brushless motor 6 operate with power from a switching power supply unit 100. The switching power supply unit 100 operates with AC power supplied from an external power supply 40 such as a commercial power supply. A control unit 3 controls the entire image forming apparatus 1.

Figure 2:
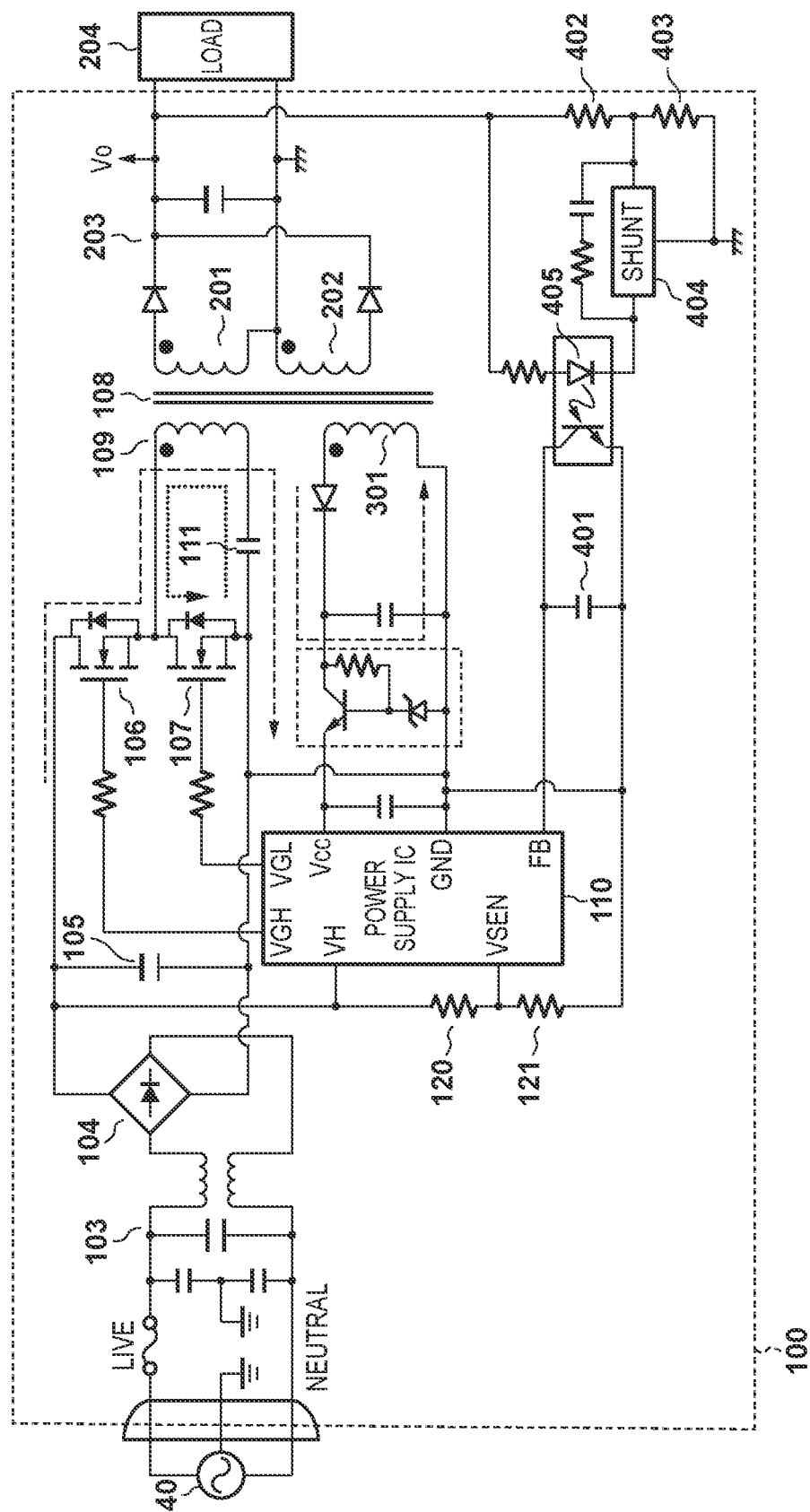
FIG. 2 is a configuration diagram of a switching power supply unit according to an embodiment.

FIG. 2 is a configuration diagram of the switching power supply unit 100. Note that the switching power supply unit 100 in the present embodiment is a current resonance type. The AC voltage supplied from the external power supply 40 is applied to a rectifier diode bridge 104 via an input filter 103. The rectifier diode bridge 104 rectifies the AC voltage and outputs a DC voltage. A primary smoothing capacitor 105 is connected to the rectifier diode bridge 104 in parallel. A DC voltage output from the rectifier diode bridge 104 is applied to a primary winding 109 of a transformer 108 via a switching FET 106. A current resonance capacitor 111 is connected to the primary winding 109 in series. A switching FET 107 is connected to the primary winding 109 in parallel. The transformer 108 includes an auxiliary winding 301 in addition to secondary windings 201 and 202.

A power supply control IC 110 includes a VH terminal, a VSEN terminal, a VGH terminal and a VGL terminal that output driving signals for driving the switching FETs 106 and 107, a Vcc terminal that is a power supply terminal, and an FB terminal for feeding back an output voltage Vo. A voltage smoothed by the primary smoothing capacitor 105 is input to the VH terminal of the power supply control IC 110, and a voltage acquired by dividing the smoothed voltage by resistors 120 and 121 is input to the VSEN terminal. First, using the voltage input to the VH terminal, the power supply control IC 110 increases the voltage at the Vcc terminal to an activation start voltage. When the voltage input to the VSEN terminal increases to an operation start voltage, the power supply control IC 110 outputs driving signals from the VGH terminal and the VGL terminal, and starts switching control of the switching FETs 106 and 107. Thereby, when the transformer 108 is driven, power is supplied from the auxiliary winding 301 to the Vcc terminal of the power supply control IC 110. When power supply from the auxiliary winding 301 to the Vcc terminal is started, the power supply control IC 110 cuts off power supply from the VH terminal to the Vcc terminal. In FIG. 2, a dashed line indicates a current during turn-on of the switching FET 106, and a dotted line indicates a current during turn-on of the switching FET 107.

Further, when the power supply control IC 110 starts switching control of the switching FETs 106 and 107, an induced voltage is generated in each of the secondary windings 201 and 202 of the transformer 108. This induced voltage is smoothed by a rectifying/smoothing circuit 203 including a rectifying diode and a smoothing capacitor, and is supplied to a load 204 as a DC output voltage Vo. In the present embodiment, the load 204 includes the DC brushless motor 6 and the stepping motor 7. A voltage acquired by dividing the output voltage Vo by resistors 402 and 403 is input to a shunt regulator 404. The shunt regulator 404 turns on/off of a photocoupler 405 according to the input voltage. The power supply control IC 110 includes a constant current circuit therein and outputs a constant current from the FB terminal. Charges of this constant current are stored in a capacitor 401. Accordingly, the voltage at the FB terminal changes depending on the on/off of the photocoupler 405. The power supply control IC 110 controls the output voltage Vo to be constant by controlling the switching frequency of the switching FETs 106 and 107 according to the voltage of the FB terminal.

Figure 3:
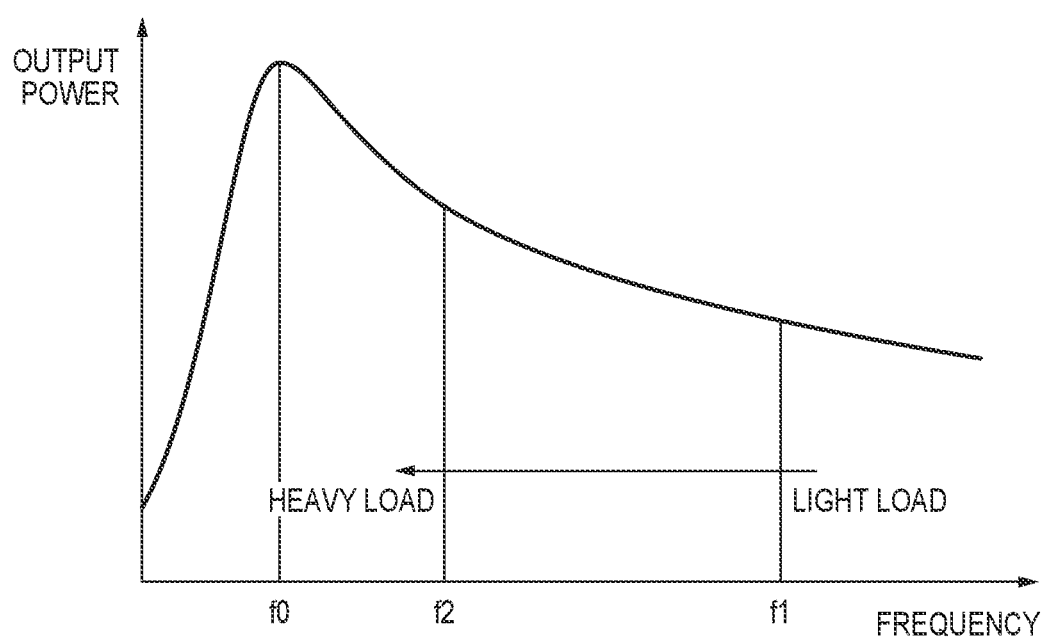
FIG. 3 is a diagram illustrating an output characteristic of the switching power supply unit according to an embodiment.

In the current resonance-type switching power supply unit 100, the switching frequency changes according to the load 204. FIG. 3 illustrates an output characteristic of the switching power supply unit 100. As illustrated in FIG. 3, the output characteristic draws a curve having a maximum value at a resonance frequency f0 due to an excitation inductance Lp and a leakage inductance Ls of the transformer 108 and a capacitance Ci of the current resonance capacitor 111. As the load is smaller, the frequency increases, and as the load is larger, the frequency decreases.

Figure 4:
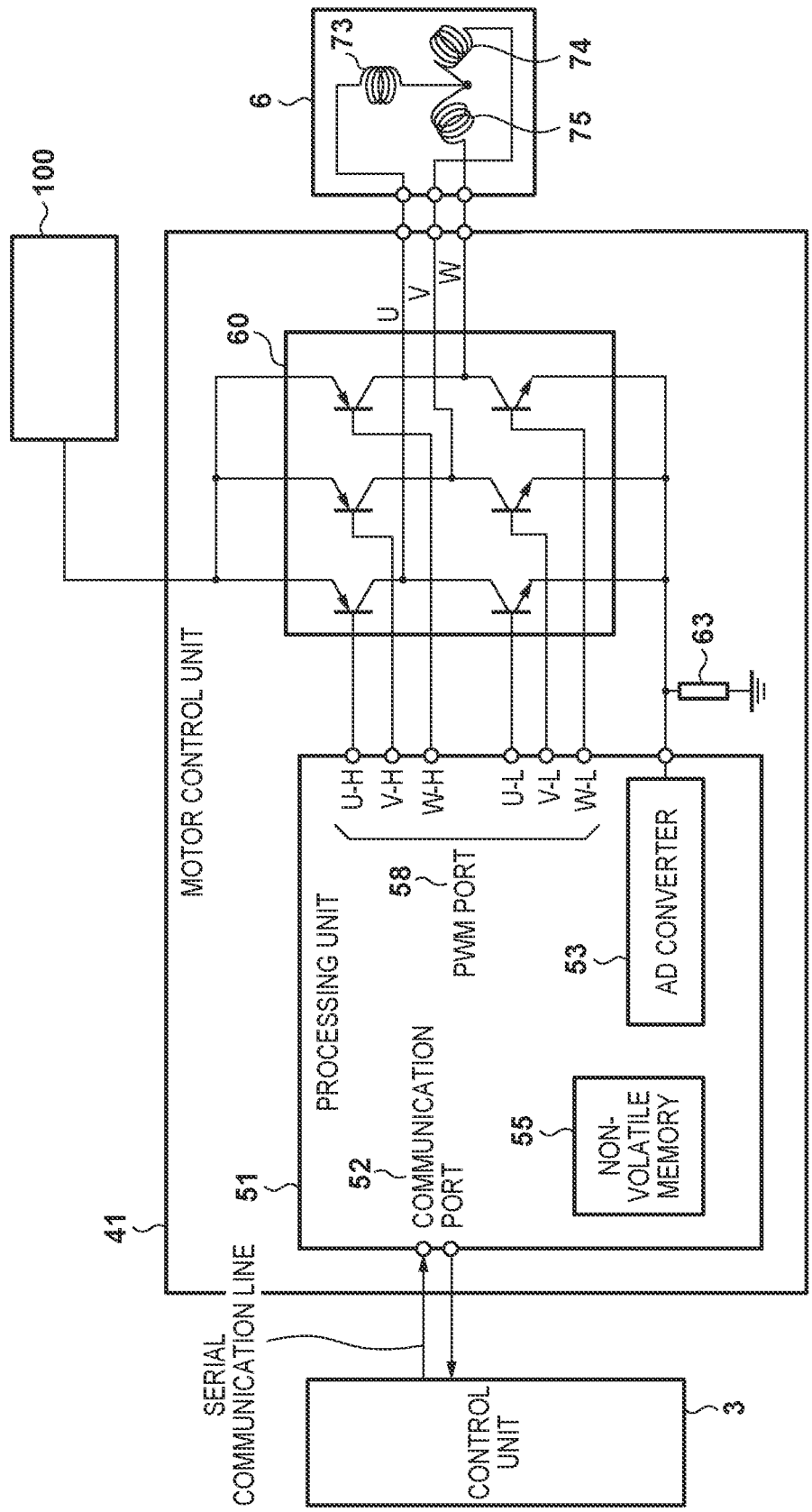
FIG. 4 is a configuration diagram of a motor control unit according to an embodiment.

FIG. 4 is a configuration diagram of the motor control unit 41 that controls the DC brushless motor 6. The motor control unit 41 includes a processing unit 51 embodied as, for example, a microcomputer. A communication port 52 performs serial data communication with the control unit 3. A pulse width modulation (PWM) port 58 outputs a PWM signal for driving each switching element of a three-phase inverter 60. The three-phase inverter 60 has a total of six switching elements on a high (H) side and a low (L) side for each of three phases (U, V, W) of the DC brushless motor 6. The switching element each are an FET, for example, and driven with an individual PWM signal. Therefore, the PWM port 58 has a total of six terminals of U-H, V-H, W-H, U-L, V-L, and W-L corresponding to the six switching elements. A DC voltage is applied from the switching power supply unit 100 to the three-phase inverter 60. The PWM signal turns on/off each of the switching elements of the three-phase inverter 60, passing the excitation current through a plurality of coils 73 (U phase), 74 (V phase) and 75 (W phase) of the DC brushless motor 6. In this way, the three-phase inverter 60 operates as an exciting unit for exciting the DC brushless motor 6. The excitation current flowing through each of the coils 73, 74, and 75 each is converted into a voltage by the resistor 63, and is input to an AD converter 53 of the processing unit 51 as a value indicating the excitation current. The nonvolatile memory 55 is a holding unit for holding data used by the processing unit 51 for processing.

Next, the structure of the DC brushless motor 6 will be described with reference to FIGS. 5A and 5B. In this embodiment, the DC brushless motor 6 has a six-slot stator 71 and a four-pole rotor 72, and the stator 71 is provided with the three-phase (U, V, W) coils 73, 74, 75. The rotor 72 is composed of a permanent magnet and has two north poles and two south poles. The position of the rotor 72 (rotation phase at stoppage or low-speed rotation) is determined by the combination of the excited coils 73, 74, 75, that is, the excitation phase. In the following description, exciting the X-Y phase excitation means exciting the X-Y phase such that the X phase becomes the N pole and the Y phase becomes the S pole. For example, when the U-V phase is excited, the U phase (coil 73) becomes the N pole and the V phase (coil 74) becomes the S pole, and the rotor 72 stops at the position illustrated in FIG. 5A. Next, when the U-W phase is excited, the U phase (coil 73) becomes the N pole and the W phase (coil 75) becomes the S pole, and the rotor 72 stops at the position illustrated in FIG. 5B.

Subsequently, detection of the rotational position (rotational phase) of the rotor 72 during the stoppage of the DC brushless motor 6 will be described. In the present embodiment, the position of the rotor 72 is detected by utilizing the fact that the inductance of each of the coils 73, 74, and 75 changes depending on the position of the rotor 72. Generally, the coil is configured to wind a copper around a core formed of laminated electromagnetic steel sheets. Further, when an external magnetic field is present, the magnetic permeability of the magnetic steel sheet is low, and the coil inductance proportional to the magnetic permeability is also small. For example, as illustrated in FIG. 5A, it is assumed that the rotor 72 is stopped such that the U-phase coils 73 are opposed to only the south pole of the rotor 72. In this case, since the influence of the external magnetic field by the rotor 72 is large, the decreasing rate of the inductance of the coil 73 increases. The decreasing rate of the inductance also changes depending on the direction of the current flowing through the U-phase coil 73. Specifically, the decreasing rate of the inductance becomes larger when the direction of the magnetic field generated by the current flowing through the coil 73 is the same as the direction of the external magnetic field from the rotor 72 than when the direction is reversed. Therefore, in the case of FIG. 5A, comparing the case where the U phase (coil 73) is excited to the N pole and with the case where the case where the U phase (coil 73) is excited to the S pole, the decreasing rate of the inductance is greater when the U phase (coil 73) is excited to the N pole. On the other hand, in the state of FIG. 5A, the W phase (coil 75) is opposed to both the S pole and the N pole of the rotor 72. Therefore, the coil 75 is less affected by the external magnetic field from the rotor 72 than the coil 73 and thus, the decreasing rate of the inductance of the coil 75 is smaller than that of the coil 73. In this manner, the inductances of the coils 73, 74, and 75 vary depending on the position of the rotor 72.

Figure 6:
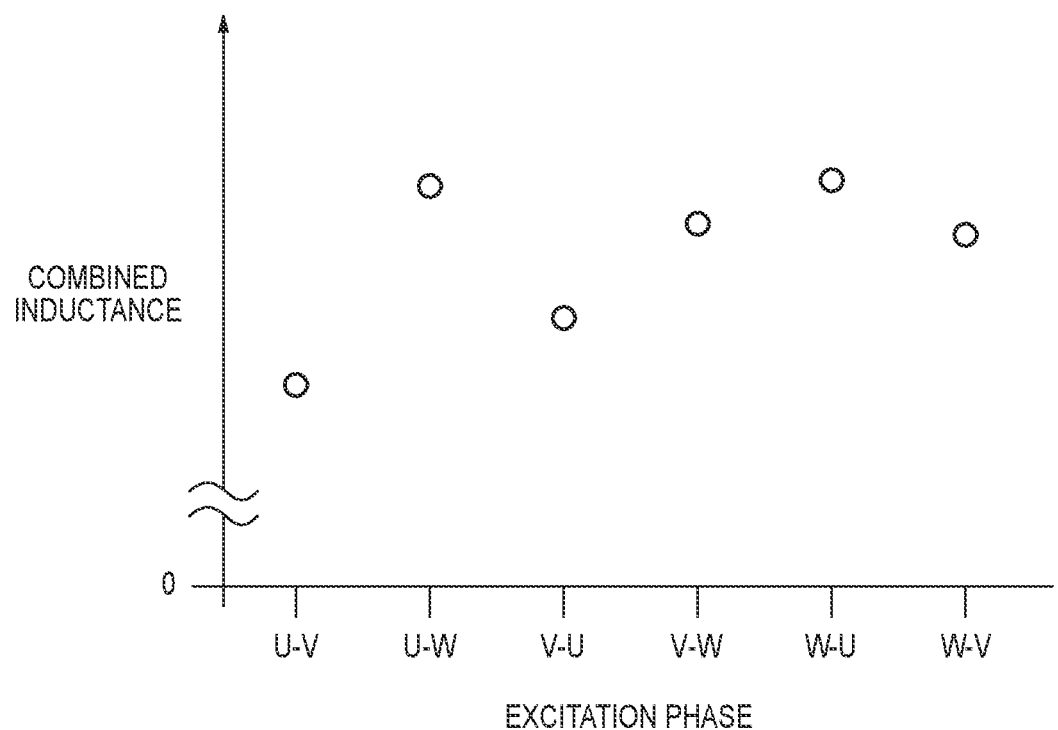
FIG. 6 is a graph illustrating a relationship between an excitation phase and a combined inductance according to an embodiment.

FIG. 6 illustrates the combined inductance measured by applying an excitation current to each excitation phase in the case where the rotor 72 is stopped at the position where the U-V phase is excited. In the following description, the position of the rotor 72 is indicated by its excitation phase. For example, the rotational position of the rotor 72 illustrated in FIG. 5A when the U-V phase is excited is referred to as the U-V phase position. As illustrated in FIG. 6, since the rotor 72 is stopped at the U-V phase position, the combined inductance measured when the U-V phase is excited is smaller than the combined inductance measured when the other excitation phases are excited. As described above, in this embodiment, all the excitation phases are sequentially excited to measure their combined inductances, and in accordance with a determination of the magnitude relationship of the combined inductances, the rotational position of the rotor 72 is determined. In the following description, excitation for determining the rotational position of the rotor 72 is referred to as position determination excitation.

In the present embodiment, the position determination excitation of each excitation phase is divided into an A period (first period) and a B period following the A period. For example, when the U-V phase is excited, during the period A (first period), a PWM signal having a predetermined duty, for example, 80% duty is output from the U-H terminal. In the period A, it is assumed that the V-L terminal is at a high level (duty is 100%), and the other terminals are at a low level (duty is 0%). In the B period (second period) following the A period, a PWM signal having a predetermined duty, for example, 80% duty is output from the V-H terminal. In the period B, it is assumed that the U-L terminal is at a high level (duty is 100%), and the other terminals are at a low level (duty is 0%). The excitation current flowing from the U-phase coil 73 toward the V-phase coil 74 increases in the A period, and decreases in the B period. The time lengths of the A period and the B period are determined based on necessary detection accuracy, with an upper limit being the period during which the rotor 72 does not rotate. In this example, each time length is set to 0.5 ms.

Figure 7A:
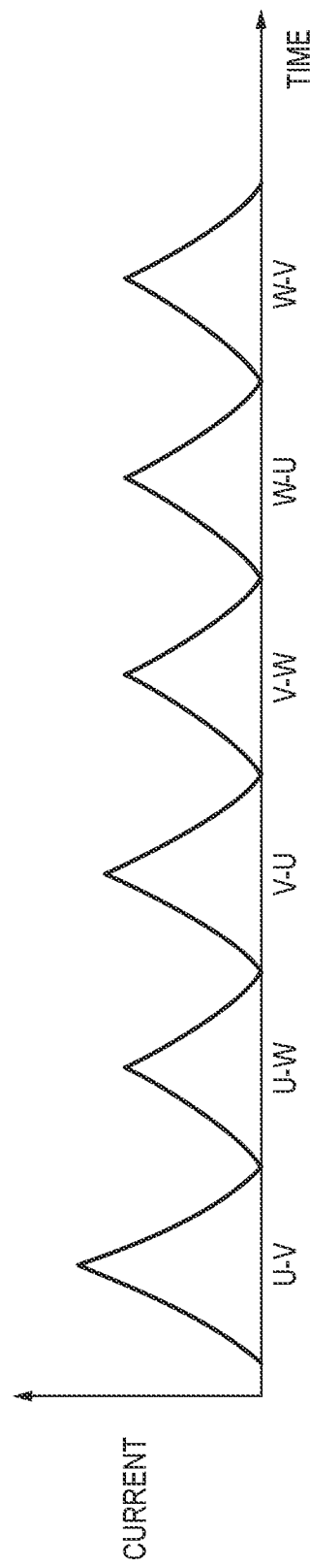
FIG. 7A is a waveform chart illustrating an excitation current in rotor position detection processing.

FIG. 7A illustrates a change over time in the excitation current flowing when excitation phases are sequentially subjected to the position determination excitation. The excitation current is detected by the resistor 63 and the AD converter 53 in FIG. 4. In the period in which the duty of the PWM signal is constant, the coil inductance changes depending on the magnitude of the excitation current and thus, the excitation current increases or decreases curvilinearly rather than linearly. The processing unit 51 detects a peak value of the excitation current at the position determination excitation of each excitation phase, thereby determining the relative magnitude of the combined inductance of each excitation phase to detect the position of the rotor 72. Specifically, since the peak value of the excitation current increases as the combined inductance decreases, the processing unit 51 determines that the position of the rotor 72 is the excitation phase position where the peak value of the excitation current is maximum.

Figure 7B:
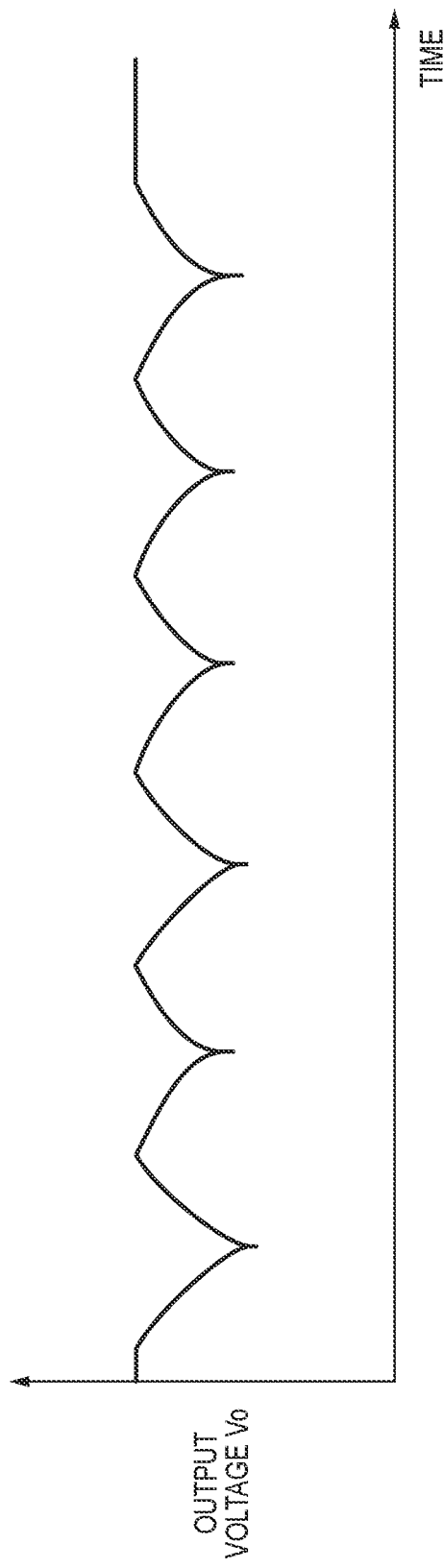
FIG. 7B is a waveform chart illustrating an output voltage of the switching power supply unit in the rotor position detection processing.

When a current as illustrated in FIG. 7A is passed from the switching power supply unit 100 operating in a state where the load 204 is small, that is, the output current is small, ripples as illustrated in FIG. 7B are generated in the output voltage Vo of the switching power supply unit 100. In order to reduce the ripples, it is necessary to increase the capacitance of the capacitor included in the switching power supply unit 100, or to reduce the impedance by thickening a wiring between the DC brushless motor 6 and the switching power supply unit 100. However, this makes the motor control unit 41 and the switching power supply unit 100 larger.

Therefore, in this embodiment, prior to the position determination excitation of the rotor 72 of the DC brushless motor 6, the stepping motor 7 is put into the hold excitation state, thereby reducing the ripples in the switching power supply unit 100. Specifically, as illustrated in FIG. 8A, when receiving a print job, the control unit 3 first performs hold excitation of the stepping motor 7. When a predetermined period Td has elapsed since the hold excitation of the stepping motor 7, the control unit 3 starts the position determination excitation and detects an initial position of the rotor 72 of the DC brushless motor 6. When detecting the initial position of the rotor 72, the control unit 3 controls the motor control unit 41 to activate the DC brushless motor 6 and transitions the DC brushless motor 6 to a steady operation of rotating at a target rotational speed. The period Td is a period elapsed until the change in the switching frequency of the switching power supply unit 100 due to the hold excitation of the stepping motor 7 is settled, that is, a period elapsed until the fluctuations in the output voltage of the switching power supply unit 100 is settled, or a longer period. As illustrated in FIG. 8B, the hold excitation of the stepping motor 7 may be canceled at start of the position determination excitation. That is, the control unit 3 continues the hold excitation of the stepping motor 7 at least until the processing of detecting the initial position of the rotor 72 of the DC brushless motor 6 is started.

Figure 9A:
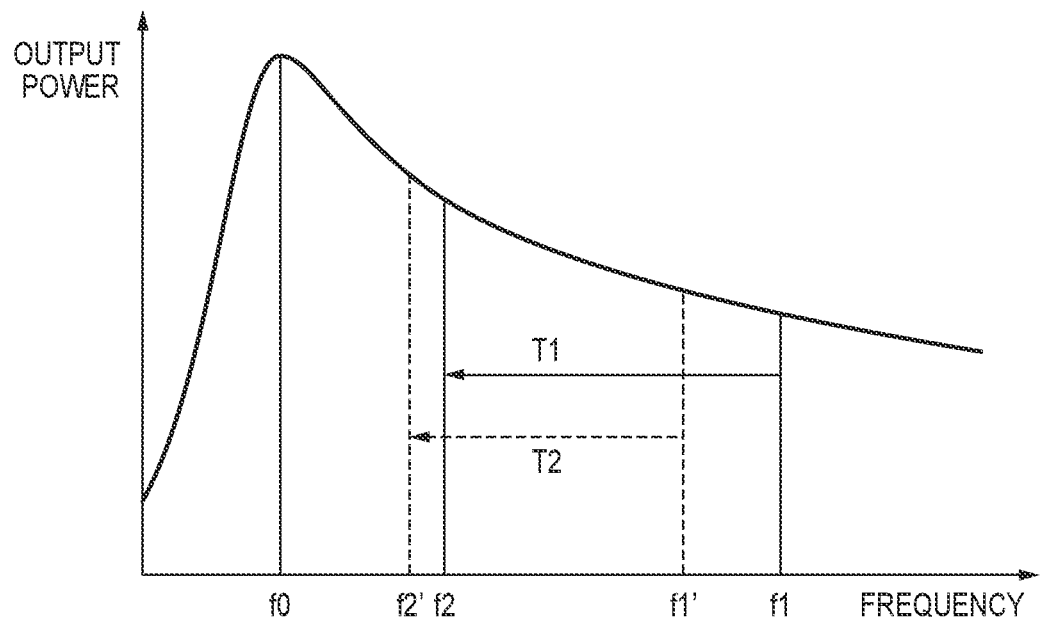
FIGS. 9A and 9B are operation explanatory diagrams of the switching power supply unit in the rotor position detection processing according to an embodiment.

Hereinafter, the reason why the ripples in the switching power supply unit 100 can be reduced by the control as illustrated in FIGS. 8A and 8B will be described. FIG. 9A illustrates the same output characteristic of the same switching power supply unit 100 as that in FIG. 3. A frequency f1 in FIG. 9A is a switching frequency before the hold excitation of the stepping motor 7, and the image forming apparatus 1 is in a light-load state before a printing operation. A frequency f1' is a switching frequency during the hold excitation of the stepping motor 7. A frequency f2 is a switching frequency at the position detection processing of the rotor 72 of the DC brushless motor 6, and a frequency f2' is a switching frequency in the case where the position detection processing of the rotor 72 of the DC brushless motor 6 is performed during the hold excitation of the stepping motor 7.

When the position determination excitation of the rotor 72 of the DC brushless motor 6 is performed without performing the hold excitation of the stepping motor 7, the switching frequency of the switching power supply unit 100 changes from f1 to f2 in FIG. 9A by a frequency T1. While the switching frequency changes, ripples occurs in the output voltage Vo of the switching power supply unit 100. In the present embodiment, since the position determination excitation of the rotor 72 of the DC brushless motor 6 is started during the hold excitation of the stepping motor 7, the switching frequency of the switching power supply unit 100 changes from f1' to f2' in FIG. 9A by a frequency T2. As illustrated in FIG. 9A, since the change in the output power with respect to the change in frequency is larger toward a maximum value (frequency f0) of the output characteristic, T2 is smaller than T1. That is, by performing the hold excitation of the stepping motor 7 prior to the position determination excitation, the change in the switching frequency can be reduced and thus, the ripples of the output voltage of the switching power supply unit 100 can be suppressed.

Figure 9B:
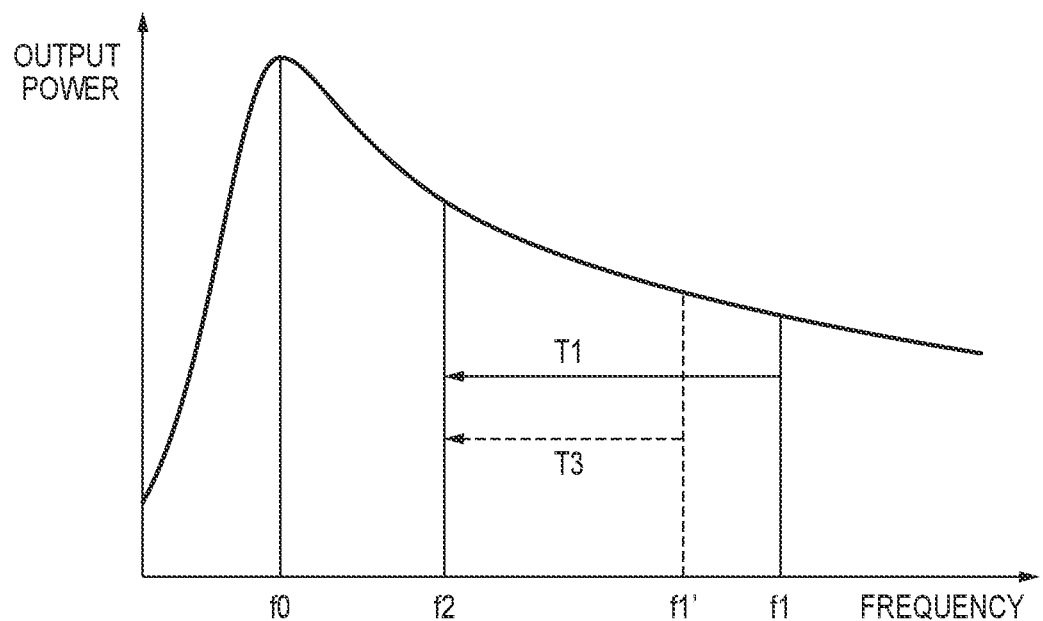

As illustrated in FIG. 8B, the hold excitation of the stepping motor 7 may be canceled at start of the position determination excitation. By canceling hold excitation of the stepping motor 7 at start of position determination excitation, the switching frequency of the switching power supply unit 100 changes from f1' to f2 in FIG. 9B by a frequency T3. However, the change T3 is smaller than T2. Therefore, the ripples of the output voltage of the switching power supply unit 100 can be further suppressed.

As described above, the position determination excitation of the rotor 72 of the DC brushless motor 6 is started after the hold excitation of the stepping motor 7. With this configuration, the change in the switching frequency of the switching power supply unit 100 can be reduced, thereby reducing the ripples of the output voltage Vo. Further, in the configuration of the present embodiment, the hold excitation of the stepping motor 7 is merely performed prior to the start of the position determination excitation of the rotor 72 of the DC brushless motor 6, which can be executed without any restrictions on the sequence in image formation. Note that the stepping motor 7 may be rotationally controlled instead of performing the hold excitation of the stepping motor 7.

In the present embodiment, in order to reduce the change in the switching frequency at start of position determination excitation of the rotor 72 of the DC brushless motor 6, power is supplied to the stepping motor 7 in advance. However, in order to reduce the change in the switching frequency at start of position determination excitation, a predetermined amount of power or more may be supplied to another load in the image forming apparatus 1 in advance.

Second Embodiment

The following describes a second embodiment mainly about differences from the first embodiment. In the first embodiment, the switching power supply unit 100 is a current resonance type. In the present embodiment, the flyback type switching power supply unit 100 is used.

Figure 10:
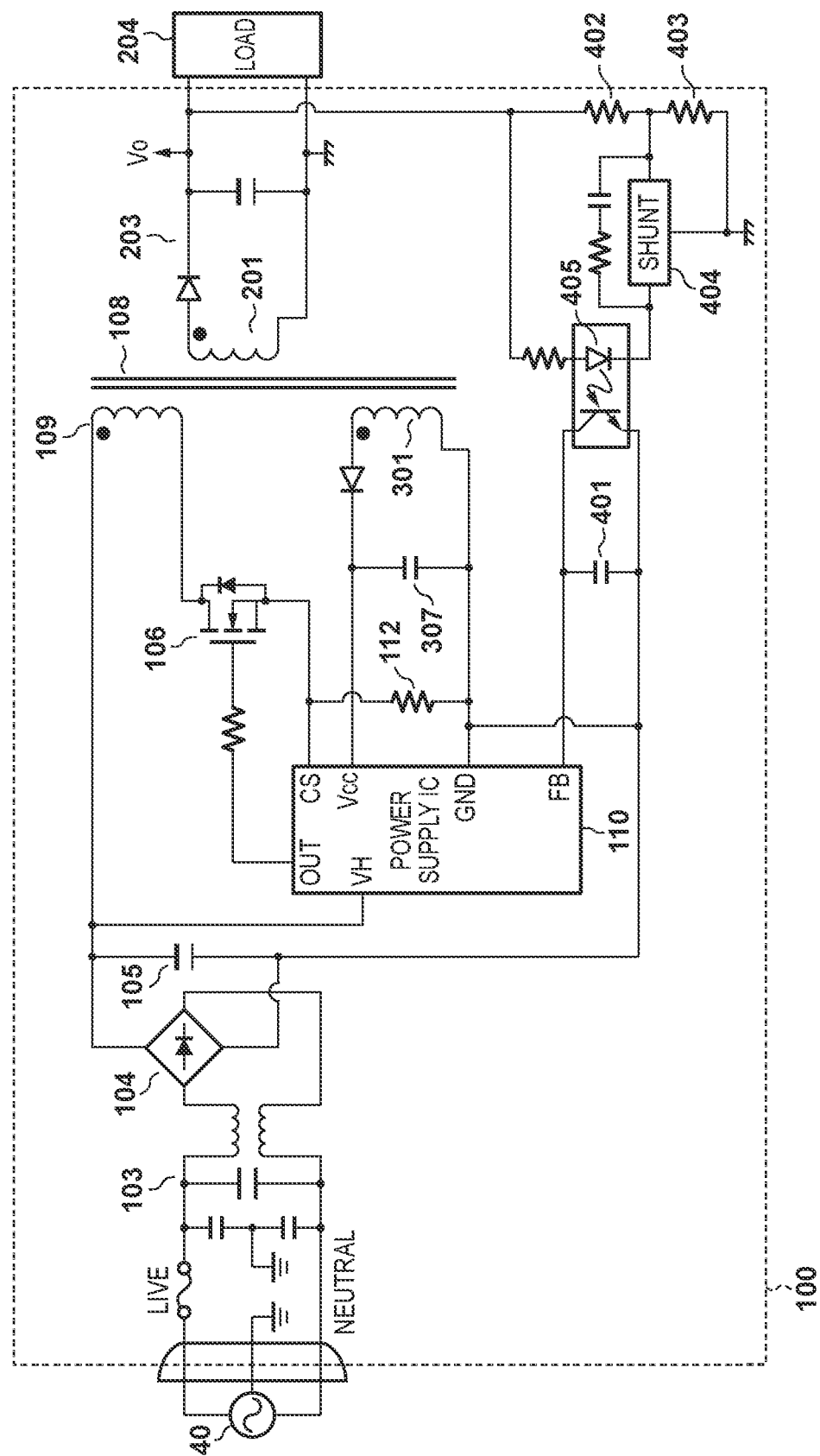
FIG. 10 is a configuration diagram of a switching power supply unit according to an embodiment.

FIG. 10 is a configuration diagram of the switching power supply unit 100 in the present embodiment. Similar components to the components of the switching power supply unit 100 (FIG. 2) in the first embodiment are given the same referential numerals, and detailed description thereof is omitted. Hereinafter, the configuration of the switching power supply unit 100 of the present embodiment will be described focusing on differences from the switching power supply unit 100 of the first embodiment. A power supply control IC 110 has a VH terminal, a CS terminal, an OUT terminal that outputs a driving signal for driving a switching FET 106, a Vcc terminal that is a power supply terminal, and an FB terminal for feeding back an output voltage Vo. An inter-terminal voltage of a current detection resistor 112 for converting a current flowing through a primary winding 109 and the switching FET 106 into a voltage is input to the CS terminal. The power supply control IC 110 charges a capacitor 307 connected to the Vcc terminal with a voltage, which is smoothed by a primary smoothing capacitor 105 and input to the VH terminal. When the voltage at the Vcc terminal rises to an activation start voltage, the power supply control IC 110 outputs the driving signal from the OUT terminal. As a result, power is supplied from an auxiliary winding 301 to the Vcc terminal, and power supply from the VH terminal to the Vcc terminal is cut off. The driving signal output from the OUT terminal is determined by the voltage input to the CS terminal and a voltage input to the FB terminal (hereinafter referred to as FB voltage). Specifically, the power supply control IC 110 outputs a low level while the voltages while the CS terminal and the FB terminal are equal, and outputs a high level during other periods. Therefore, the output voltage Vo can be controlled by controlling the voltage at the FB terminal.

Figure 11A:
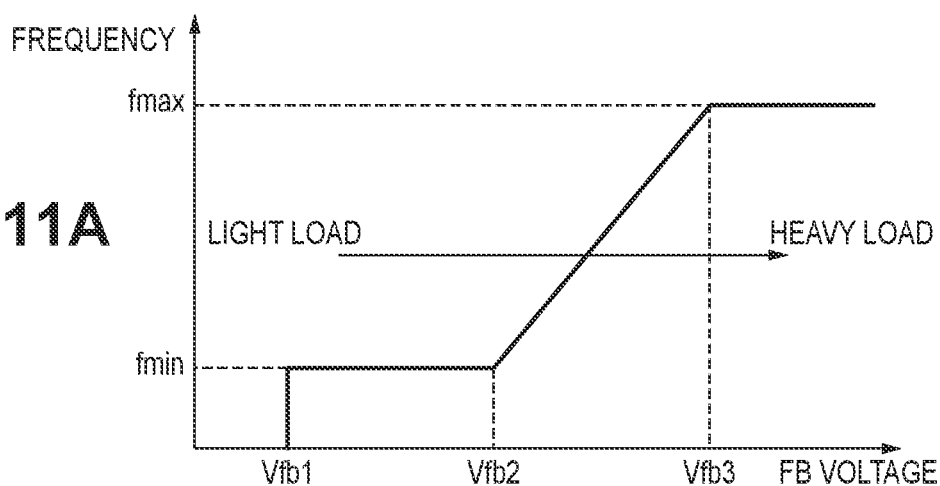
FIGS. 11A to 11C are operation explanatory diagrams of the switching power supply unit in the rotor position detection process according to an embodiment.

The power supply control IC 110 in the present embodiment changes the switching frequency for switching the switching FET 106 according to the FB voltage. FIG. 11A illustrates a switching frequency characteristic of the switching power supply unit 100 according to the present embodiment. The FB voltage becomes higher as the load of the load 204 becomes larger. In the section where the FB voltage is between Vfb1 and Vfb2, a discontinuous operation is performed at the lowest switching frequency. A continuous operation is performed when the FB voltage is Vfb2 or more, and the switching frequency increases to a maximum frequency fmax as the load 204 increases.

Figure 11B:
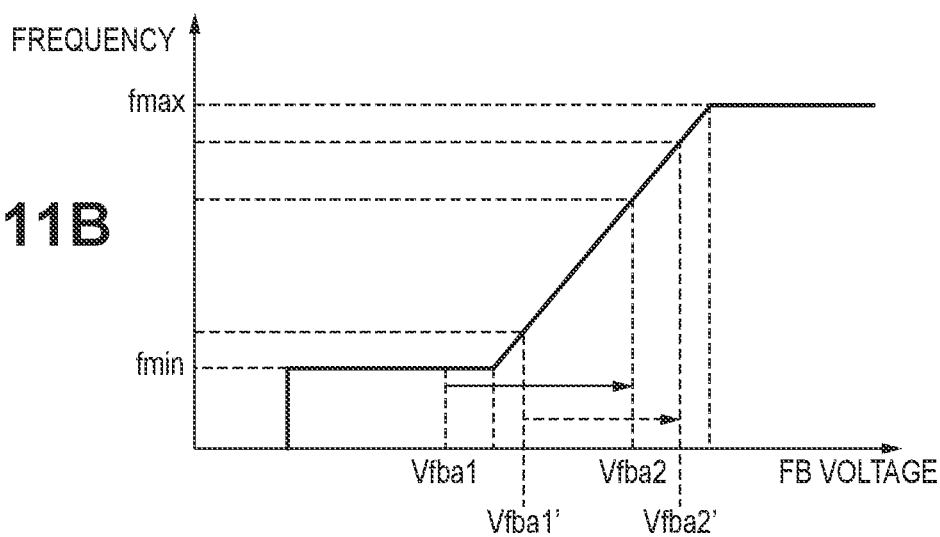
Figure 12A:
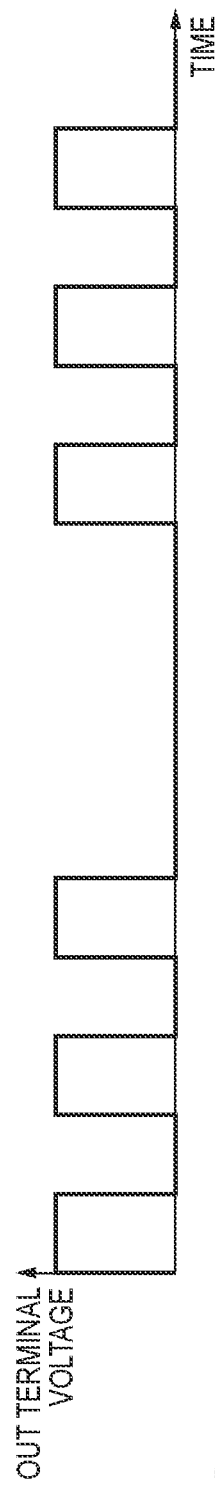
FIGS. 12A to 12D are diagrams illustrating a driving signal in the rotor position detection processing according to an embodiment.
Figure 12B:
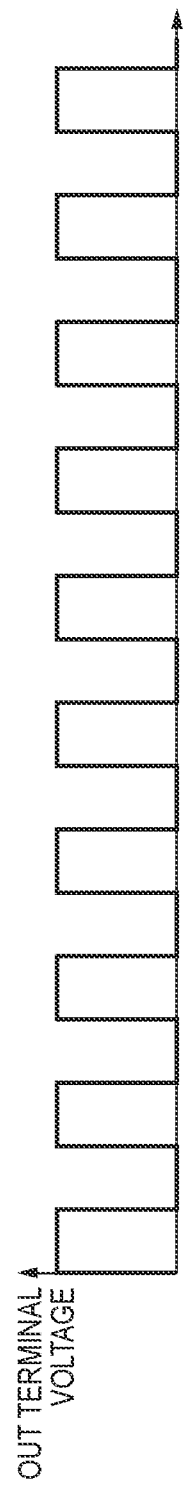
Figure 12C:
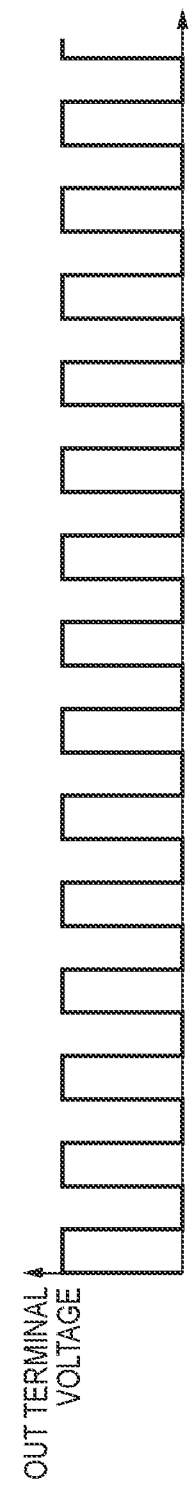
Figure 12D:
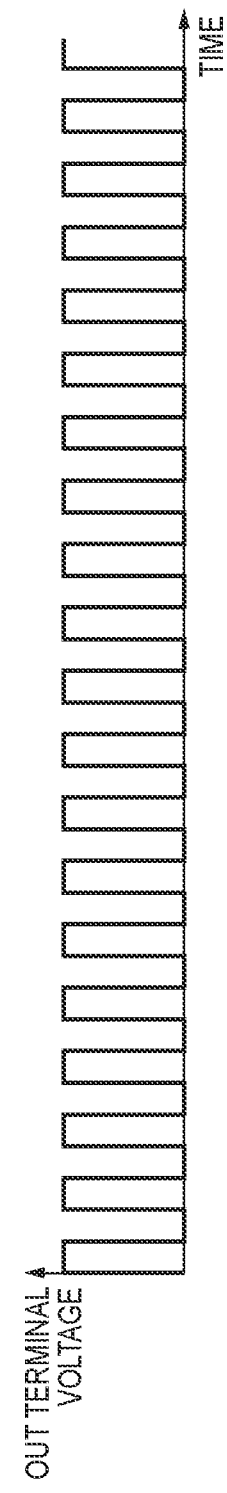

Also in the present embodiment, as in the first embodiment, the hold excitation of the stepping motor 7 is performed prior to the start of the position determination excitation of the DC brushless motor 6. Vfba1 in FIG. 11B is the FB voltage before the hold excitation of the stepping motor 7, and the image forming apparatus 1 is in a light-load state before a printing operation. At this time, the power supply control IC 110 is in a discontinuous mode of discontinuously performing the switching operation, in which a discontinuous driving signal as illustrated in FIG. 12A is output from the OUT terminal. A voltage Vfba1' is an FB voltage during the hold excitation of the stepping motor 7. At this time, the power supply control IC 110 is in a continuous mode of continuously performing the switching operation, in which a driving signal as illustrated in FIG. 12B is output from the OUT terminal. The voltage Vfba2 is an FB voltage at the position determination excitation of the rotor 72 of the DC brushless motor 6. At this time, the power supply control IC 110 is in a continuous mode, in which a driving signal as illustrated in FIG. 12C, having a higher frequency than the driving signal in FIG. 12B is output from the OUT terminal. A voltage Vfba2' is an FB voltage at the hold excitation of the stepping motor 7 and the position determination excitation of the rotor 72 of the DC brushless motor 6. At this time, the power supply control IC 110 is in a continuous mode, in which a driving signal as illustrated in FIG. 12D, having a higher frequency than the driving signal in FIG. 12C is output from the OUT terminal.

When the position determination excitation of the rotor 72 of the DC brushless motor 6 is performed without performing the hold excitation of the stepping motor 7, the FB voltage of the switching power supply unit 100 changes from Vfba1 to Vfba2 in FIG. 11B. At this time, the power supply control IC 110 must transition from the discontinuous mode to the continuous mode, generating voltage ripples of the output voltage Vo due to the mode transition and the change in the switching frequency. In the present embodiment, since the position determination excitation of the rotor 72 of the DC brushless motor 6 is started during the hold excitation of the stepping motor 7, the FB voltage transitions from Vfba'1 to Vfba'2 in FIG. 11B. At this time, the power supply control IC 110 remains in the continuous mode and no mode transition occurs. That is, the mode transition may be prevented by performing the hold excitation of the stepping motor 7, thereby suppressing ripples of the output voltage of the switching power supply unit 100.

Figure 11C:
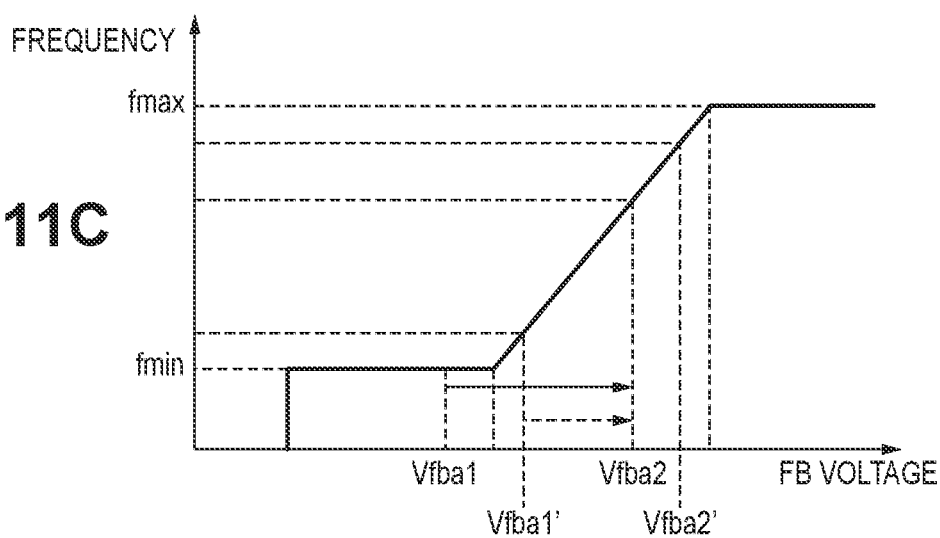

As illustrated in FIG. 11C, the hold excitation of the stepping motor 7 may be canceled at the start of position determination excitation. By canceling the hold excitation of the stepping motor 7 at the start of the position determination excitation, the change in the switching frequency of the switching power supply unit 100 can be further reduced to further suppress the ripples of the output voltage of the switching power supply unit 100.

As described above, the position determination excitation of the rotor 72 of the DC brushless motor 6 is preformed after the hold excitation of the stepping motor 7. The ripples of the output voltage Vo can be reduced by transitioning the operation mode of the power supply control IC 110 to the continuous mode in advance through the hold excitation of the stepping motor 7. Further, in the configuration of the present embodiment, the hold excitation of the stepping motor 7 is merely performed prior to the start of the position determination excitation of the rotor 72 of the DC brushless motor 6, which can be executed without any restrictions on the sequence in image formation. Note that the stepping motor 7 may be rotationally controlled instead of performing the hold excitation of the stepping motor 7. Furthermore, before performing the position determination excitation, a predetermined amount of power or more for transitioning the operation mode of the switching power supply unit 100 to the continuous mode may be supplied to a load in the image forming apparatus other than the stepping motor 7.

In each of the above-described embodiments, the motor control unit 41 is described as a component of the image forming apparatus 1. However, the motor control unit 41 may be a single device that serves as a motor control apparatus. Further, an apparatus including the control unit 3 and the motor control unit 41 may be a motor control apparatus. In the above embodiments, the DC brushless motor 6 supplies a driving force to the image forming unit such as the photosensitive member 11 of the image forming apparatus 1. However, the DC brushless motor 6 may supply a driving force to a conveying unit for conveying the recording material P. Further, the configuration of the DC brushless motor 6 is not limited to the configuration illustrated in FIGS. 5A and 5B, and may be a motor having another number of poles or phases.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-027653, filed on Feb. 19, 2019, which is hereby incorporated by reference herein in its entirety.

What is claimed is:

1. A motor control apparatus comprising:
a switching power supply;
a first motor configured to operate with a voltage from the switching power supply; and
a control unit configured to control the first motor, wherein
the control unit is further configured to detect an initial position of a rotor of the first motor based on current flowing through the first motor during a period, in which power supply from the switching power supply to a load other than the first motor is performed, and
the control unit is further configured to continue the power supply to the load until detection of the initial position of the rotor is started.

2. The motor control apparatus according to claim 1, wherein the control unit is further configured to detect the initial position of the rotor based on excitation current flowing through each of a plurality of excitation phases of the first motor.

3. The motor control apparatus according to claim 1, wherein the first motor is further configured to have no sensor for detecting a position of the rotor.

4. The motor control apparatus according to claim 1, wherein the control unit is further configured to detect the initial position of the rotor during the period, in which the power supply with at least a predetermined amount of power from the switching power supply to the load is performed.

5. The motor control apparatus according to claim 1, wherein the control unit is further configured to stop the power supply from the switching power supply to the load when the detection of the initial position of the rotor is started.

6. The motor control apparatus according to claim 1, wherein the control unit is further configured to start detection of the initial position of the rotor after a predetermined period has elapsed since the power supply to the load is started.

7. The motor control apparatus according to claim 6, wherein the predetermined period is a period from start of the power supply from the switching power supply to the load to settlement of fluctuation in an output voltage of the switching power supply.

8. The motor control apparatus according to claim 1, wherein the switching power supply operates in either a continuous mode in which a switching operation is continuously performed or a discontinuous mode in which the switching operation is performed discontinuously, and wherein the control unit is further configured to cause the switching power supply to operate in the continuous mode by the power supply to the load and then start detection of the initial position of the rotor.

9. A motor control apparatus comprising:
a switching power supply;
a first motor configured to operate with a voltage from the switching power supply; and
a control unit configured to control the first motor, wherein
the control unit is further configured to detect an initial position of a rotor of the first motor based on current flowing through the first motor during a period, in which power supply from the switching power supply to a load other than the first motor is performed, and
the load is a second motor that is different from the first motor.

10. The motor control apparatus according to claim 9, wherein the second motor is a motor that does not require detection of an initial position at activation.

11. The motor control apparatus according to claim 9, wherein the second motor is a stepping motor.

12. The motor control apparatus according to claim 11, wherein the control unit is further configured to perform hold excitation of the stepping motor to start the power supply from the switching power supply to the stepping motor before detection of the initial position of the rotor.

13. The motor control apparatus according to claim 11, wherein the control unit is further configured to rotate the stepping motor to start the power supply from the switching power supply to the stepping motor before detection of the initial position of the rotor.

14. A motor control apparatus comprising:
a switching power supply configured to operate in either a continuous mode in which a switching operation is continuously performed or a discontinuous mode in which the switching operation is discontinuously performed;
a first motor configured to operate with a voltage from the switching power supply; and
a control unit configured to control the first motor; wherein
the control unit is further configured to detect an initial position of a rotor of the first motor based on a current flowing through the first motor during a period, in which the control unit causes the switching power supply to operate in the continuous mode.

15. The motor control apparatus according to claim 14, wherein the control unit is configured to detect the initial position of the rotor during the period, in which the control unit causes the switching power supply to supply power to a load other than the first motor, and to operate in the continuous mode.

16. An image forming apparatus comprising:
a switching power supply;
a conveying unit configured to convey a sheet;
a forming unit configured to form an image on the sheet conveyed by the conveying unit;
a first motor configured to operate with a voltage from the switching power supply and transmit a driving force to the conveying unit or the forming unit; and
a control unit configured to control the first motor, wherein
the control unit is further configured to detect an initial position of a rotor of the first motor based on current flowing through the first motor during a period, in which power supply from the switching power supply to a load other than the first motor is performed, and the control unit is further configured to continue the power supply to the load until detection of the initial position of the rotor is started.

17. An image forming apparatus comprising:

a switching power supply configured to operate in either a continuous mode in which a switching operation is continuously performed or a discontinuous mode in which the switching operation is discontinuously performed;

a conveying unit configured to convey a sheet;

a forming unit configured to form an image on the sheet conveyed by the conveying unit;

a first motor configured to operate with a voltage from the switching power supply and transmit a driving force to the conveying unit or the forming unit; and a control unit configured to control the first motor, wherein the control unit is further configured to detect an initial position of a rotor of the first motor based on a current flowing through the first motor during a period, in which the control unit causes the switching power supply to operate in the continuous mode.

* * * * *